(12) United States Patent
Vinyals et al.

(10) Patent No.: US 11,263,514 B2
(45) Date of Patent: Mar. 1, 2022

(54) PROCESSING AND GENERATING SETS USING RECURRENT NEURAL NETWORKS

(71) Applicant: Google LLC, Mountain View, CA (US)

(72) Inventors: Oriol Vinyals, London (GB); Samuel Bengio, Los Altos, CA (US)

(73) Assignee: Google LLC, Mountain View, CA (US)

( * ) Notice: Subject to any disclaimer, the term of this patent is extended or adjusted under 35 U.S.C. 154(b) by 769 days.

(21) Appl. No.: 15/406,557

(22) Filed: Jan. 13, 2017

(65) Prior Publication Data
US 2017/0200076 A1 Jul. 13, 2017

Related U.S. Application Data

(60) Provisional application No. 62/278,356, filed on Jan. 13, 2016.

(51) Int. Cl.
G06N 3/04 (2006.01)

(52) U.S. Cl.
CPC ......... *G06N 3/0445* (2013.01); *G06N 3/0454* (2013.01)

(58) Field of Classification Search
CPC ...... G06N 3/0445; G06N 3/0454; G06N 3/08; Y04S 10/54
See application file for complete search history.

(56) References Cited

U.S. PATENT DOCUMENTS

| 6,601,052 B1 * | 7/2003 | Lee | G06N 3/0454 706/25 |
| 2015/0227849 A1 * | 8/2015 | Jaros | G06N 7/005 706/12 |
| 2016/0350653 A1 * | 12/2016 | Socher | G06N 5/04 |
| 2017/0103324 A1 * | 4/2017 | Weston | G06F 16/285 |

OTHER PUBLICATIONS

Luong et. al., "Effective Approaches to Attention-based Neural Machine Translation", 2015 (Year: 2015).*
Stewart et. al., "Spaun: A Perception-Cognition-Action Model Using Spiking Neurons", 2012 (Year: 2012).*
Giles et. al., "Learning, invariance, and generalization in high-order neural networks", 1987 (Year: 1987).*

(Continued)

*Primary Examiner* — Li B. Zhen
*Assistant Examiner* — Selene A. Haedi
(74) *Attorney, Agent, or Firm* — Fish & Richardson P.C.

(57) ABSTRACT

In one aspect, this specification describes a recurrent neural network system implemented by one or more computers that is configured to process input sets to generate neural network outputs for each input set. The input set can be a collection of multiple inputs for which the recurrent neural network should generate the same neural network output regardless of the order in which the inputs are arranged in the collection. The recurrent neural network system can include a read neural network, a process neural network, and a write neural network. In another aspect, this specification describes a system implemented as computer programs on one or more computers in one or more locations that is configured to train a recurrent neural network that receives a neural network input and sequentially emits outputs to generate an output sequence for the neural network input.

20 Claims, 5 Drawing Sheets

(56) References Cited

OTHER PUBLICATIONS

Bahdanau et. al., "Neural Machine Translation By Jointly Learning To Align and Translate", 2015 (Year: 2015).*
'www.stackoverflow.com' [online] "Effects of randomizing the order of inputs to a neural network," [retrieved on Feb. 2, 2017] Retrieved from Internet: URL<http://stackoverflow.com/questions/8101925/effects-of-randomizing-the-order-of-inputs-to-a-neural-network> 2 pages.
'www.webpages.ttu.edu' [online] "A Basic Introduction to Feedforward Backpropagation Neural Networks" [retrieved on Feb. 2, 2017] Retrieved from Internet: URL<http://www.webpages.ttu.edu/dleverin/neural_network/neural_networks.html> 25 pages.
'www.nikhilbuduma.com' [online] "A Deep Dive into Recurrent Neural Nets," Jan. 11, 2015 [retrieved on Feb. 2, 2017] Retrieved from Internet: URL<http://nikhilbuduma.com/2015/01/11/a-deep-dive-into-recurrent-neural-networks/> 18 pages.
Bahdanau et al. "Neural machine translation by jointly learning to align and translate," International Conference on Learning Representations, 2015, 15 pages.
Bahdanau et al. "End-to-end attention-based large vocabulary speech recognition," arXiv preprint arXiv 1508.04395, 2015, 8 pages.
Bakir et al. "Predicting Structured Data," MIT Press, 2007, 29 pages.
Chan et al. "Listen, attend and spell," arXiv, abs/1508.01211, 2015, 16 pages.
Cho et al. "Learning phrase representations using RNN encoder-decoder for statistical machine Translation," CoRR, 2014, 15 pages.
Donahue et al. "Long-term recurrent convolutional networks for visual recognition and description," In Proc. CVPR, 2015, 10 pages.
Graves. "Supervised Sequence Labelling with Recurrent Neural Networks," Springer, 2012, 137 pages.
Graves et al. "Neural taring machines," arXiv preprint arXiv 1410.5401, 2014, 26 pages.
Hinton et al. "Deep neural networks for acoustic modeling in speech recognition," IEEE Signal Processing Magazine, 29:82-97, 2012, 27 pages.
Hochreiter et al. "Long short-term memory," Neural Computation, 9(8), 1997, 46 pages.
Ioffe et al. "Batch normalization: Accelerating deep network training by reducing internal covariate shift," Proceedings of the $32^{nd}$ International Conference on Machine Learning, ICML, 2015, 11 pages.
Kalchbrenner et al. "Recurrent continuous translation models," Proc. EMNLP, 2013, 10 pages.
Maas et al. "Word-level acoustic modeling with convolutional vector regression," ICML, 2012 Workshop on Representation Learning, 2012, 8 pages.
Mao et al. "Deep captioning with multimodal recurrent neural networks (m-RNN)," International Conference on Learning Representations, 2015, 17 pages.
Socher et al. "Learning continuous phrase representations and syntactic parsing with recursive neural networks," Advances in Neural Information processing Systems, 2010, 9 pages.
Sutskever et al. "Sequence to sequence learning with neural networks," In Advances in Neural Information Processing Systems, 2014, 9 pages.
Vinyals et al. "Pointer networks," arXiv preprint arXivl506.03134, 2015, 9 pages.
Vinyals et al. "Grammar as a foreign language," Advances in Neural Information Processing Systems, 2015, 9 pages.
Vinyals et al. "Show and tell: A neural image caption generator," arXiv preprint arXiv 1411.4555, 2014, 9 pages.
Weston et al. "Memory networks," arXiv preprint arXivl410.3916, 2014, 15 pages.
Zaremba et al. "Learning to execute," arXiv, abs/1410.4615, 2014, 25 pages.
Zaremba et al. "Reinforcement learning neural turing machines," arXiv preprint arXiv 1505.00521, 2015, 13 pages.
Zaremba et al. "Recurrent neural network regularization," arXiv, abs/1409.2329, 2014, 8 pages.

* cited by examiner

PROCESSING AND GENERATING SETS USING RECURRENT NEURAL NETWORKS

CROSS-REFERENCE TO RELATED APPLICATIONS

This application claims priority to U.S. Provisional Application No. 62/278,356, filed on Jan. 13, 2016. The disclosure of the prior application is considered part of and is incorporated by reference in its entirety in the disclosure of this application

BACKGROUND

This specification relates to processing and generating sets of outputs using recurrent neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a Long Short-Term Memory (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

In one aspect, this specification describes a recurrent neural network system implemented by one or more computers in one or more locations that is configured to process input sets to generate neural network outputs for each input set. An input set is a collection of multiple inputs to the recurrent neural network system for which the order does not matter, i.e., a collection for which the recurrent neural network should generate the same neural network output regardless of the order in which the inputs are arranged in the collection.

The recurrent neural network includes a read neural network that is configured to receive an input set that includes multiple inputs and process each input in the input set to generate a respective memory vector for each input in the input set.

The recurrent neural network also includes a process neural network that is configured to process the respective memory vectors to generate an order-invariant numeric embedding for the input set. The order-invariant numeric embedding is a numeric representation of the input set that is permutation invariant to the inputs in the input set. That is, regardless of the order in which the process neural network processes the memory vectors, the order-invariant numeric embedding generated by the recurrent neural network will be the same.

The recurrent neural network also includes a write neural network that is configured to process the order-invariant numeric embedding to generate the neural network output for the input set. The architecture of the write neural network will generally depend on the type of neural network output that the system is configured to generate.

In another aspect, this specification describes a system implemented as computer programs on one or more computers in one or more locations that is configured to train a recurrent neural network that receives a neural network input and sequentially emits outputs to generate an output sequence for the neural network input. The system receives training data for training the recurrent neural network. The training data includes training example pairs, with each training example pair including a training input and a target output set for the training input.

The system trains the recurrent neural network on the training data. In particular, for each training example pair, the system selects a particular order for the target outputs from the target output set in the training example pair and trains the recurrent neural network to generate an output sequence for the training input in the training example pair that matches a sequence having the target outputs from the target output set arranged according to the particular order.

The neural network system described in the first aspect of this specification and the recurrent neural network trained according to the techniques described in the second aspect of this specification can be configured to receive any kind of digital data input and to generate any kind of score or classification output based on the input. Various example kinds of inputs and outputs that may be processed by the neural network systems of either aspect of this specification are described further below in the Detailed Description.

Implementations of the subject matter described herein may be embodied in methods that perform any of the operations described herein; one or more computer-storage media encoded with instructions that, when executed by one or more computers, cause the one or more computers to perform any of the operations described herein; or computing systems having one or more computers and one or more storage devices storing instructions that are operable, when executed by the one or more computers, to cause the one or more computers to perform any of the operations described herein.

Some implementations of the subject matter described herein may, in certain instances, realize particular advantages. For example, a neural network system implemented according to the first aspect described in the specification may enable generation of a neural network output from an unordered input set. Regardless of the order that the input data items occur in the input set or are processed by the system, the system will generate the same neural network output for the input set. Thus, the ability of conventional recurrent neural networks that process ordered sequences of input items may be extended to process unordered sets of input items. As another example, a neural network training system implemented according to the second aspect described in the specification may allow a recurrent neural network to be trained from training examples having target output sets for which an order is not specified before training begins.

DETAILED DESCRIPTION

Figure 1:
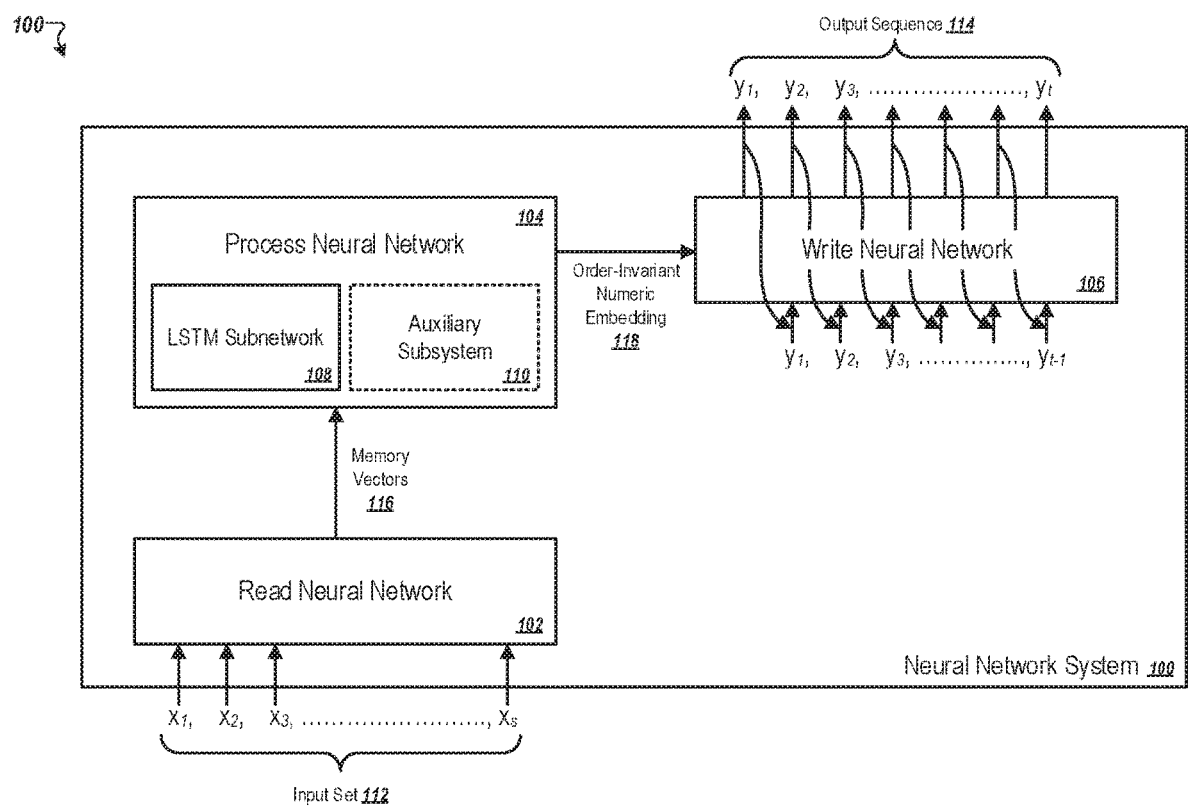
FIG. 1 depicts an example neural network system that processes a set of inputs to generate a neural network output.

This specification describes recurrent neural network systems that are configured to process input sets or that are trained on training data having target output sets. An input set is a collection of multiple input data items to the recurrent neural network system that are unordered or for which the order does not matter in generating a neural network output from the input set. A target output set is a collection of target output data items for which no order is specified a priori, i.e., for which no order is specified before training.

In particular, in a first aspect, this specification describes a recurrent neural network system that is configured to process input sets to generate neural network outputs for each input set. Because the order of inputs in a given input set does not matter, the recurrent neural network system in the first aspect has the property that it will generate the same neural network output regardless of the order in which the inputs are arranged in the input set or the order in which the neural network system receives and processes the inputs in the input set.

In a second aspect, this specification describes a training system that trains a recurrent neural network to receive a neural network input and sequentially emit outputs that form an output sequence for the neural network input. The training can be performed so that, for a given training example pair having a training input and a collection of target outputs that form a target output set (i.e., a set for which no order is specified for the target outputs a priori), the system selects a particular order for the target outputs from the target output set and trains the recurrent neural network to generate an output sequence for the training input in the training example pair that matches a sequence having the target outputs from the target output set arranged according to the particular order.

As previously discussed, recurrent neural networks are generally capable of receiving an input sequence and generating an output sequence from the input sequence. The input sequence can include multiple inputs arranged in a particular order. The output sequence can include multiple outputs that are also arranged in a particular order. As one example, a recurrent neural network in a machine translation system may be configured to receive a sequence of words in one language (e.g., English) and to generate a translated sequence of words in another language (e.g., Spanish). Because the order of words in a natural language expression help to impart meaning on the expression, recurrent neural networks are often well-suited for machine translation or other tasks where the inputs have a defined order, and where the target outputs in training sets used in training the network also have a defined order.

In some instances, however, variable sized inputs and/or outputs might not be naturally expressed as ordered sequences. For example, in a number sorting system, the input set of numbers may be unordered, and yet the system may still be required to generate a sorted output regardless of the order that the numbers in the input set are received and processed by the system. Accordingly, this specification describes systems, methods, devices, and other techniques by which recurrent neural network systems may be employed to process input sets for which the order of inputs does not matter. In another aspect, this specification describes systems, methods, devices, and other techniques by which a recurrent neural network may be trained on training target sets for which no output order is specified a priori.

Referring to FIG. 1, an example neural network system 100 is depicted that is configured to process a set of inputs 112 and to generate a neural network output, e.g., output sequence 114, from the set of inputs 112. The input set 112 includes a collection of input data items $x_1 \ldots x_s$ that are either unordered or that are ordered, but for which the order does not matter. For example, the input set 112 may represent a collection of words, numbers, or other data items that are not naturally expressed as an ordered sequence. The size of the input set 112 (i.e., the number of data items in the input set 112) may or may not be fixed. In general, the neural network system 100 may be configured to process variably sized input sets, i.e., input sets that contain different numbers of data items.

Depending on the particular implementation of neural network system 100, the neural network output generated by the neural network system 100 may take different forms. In some implementations, as in the example shown in FIG. 1, the neural network output is an output sequence 114 that contains a sequence of output data items $y_1 \ldots y_t$. In some implementations, the neural network output provides pointers that point to elements of the input set 112.

The neural network system 100 includes a read neural network 102, a process neural network 104, and a write neural network 106. Together, these components 102, 104, and 106 are configured to generate the neural network output 114 from the set of input data items 112. The neural network system 100 may be implemented as computer programs on one or more computers in one or more locations.

The read neural network 102 is configured to receive an input set, e.g., input set 112, and to process each input in the input set to generate a respective memory vector, e.g., memory vector 116, for each input in the input set. In some implementations, the read neural network 102 is a feedforward neural network that includes one or more hidden layers. The memory vector 116 for a given input data item in the input set 112 may be the output of the last hidden layer of the feedforward neural network that results from processing the input data item. In some implementations, the same read neural network 102 processes each input data item in the input set 112 one at a time to generate the respective memory vectors 116. The system 100 is agnostic to the order in which the read neural network 102 processes the input data items and generates memory vectors 116. In other implementations, multiple instances of the read neural network 102 may process two or more of the input data items in parallel.

The process neural network 104 is configured to process the respective memory vectors 116 for each of the input data items to generate an order-invariant numeric embedding 118 for the input set 112. The order-invariant numeric embedding 118 is a numeric representation of the input set 112 that is permutation invariant to the input data items in the input set 112. That is, regardless of the order in which the process neural network 104 processes the memory vectors 116, the order-invariant numeric embedding 118 generated by the process neural network 104 will still be the same.

The process neural network 104 includes a long short-term memory (LSTM) subnetwork 108 and, optionally, an auxiliary subsystem 110. In some implementations, the auxiliary subsystem 110 is part of the process neural network 104. In other implementations, the auxiliary subsystem 110 is external to the process neural network 104 and the system 100 provides an interface for data to be exchanged between the process neural network 104 and the auxiliary subsystem 110. The LSTM subnetwork 108 can include one or more LSTM memory blocks that allow the LSTM subnetwork 108 to maintain an internal state. For instance, each LSTM memory block can include one or more cells that each include an input gate, a forget gate, and an output gate that allow the cell to store previous states for the cell, e.g., for use in generating a current activation or to be provided to other components of the LSTM neural network. The internal state of the LSTM subnetwork 108 at a given time step can represent the stored states of all or some of the cells of the subnetwork 108 at the time step.

The process neural network 104 receives the memory vectors 116 from the read neural network 102 and processes the vectors 116 over multiple time steps to generate the order-invariant numeric embedding 118. At each time step, the process neural network 104 applies an attention mechanism over the memory vectors 116 and updates the internal state of the LSTM subnetwork 108. The system 100 then uses the internal state of the LSTM subnetwork 108 that results after the last time step as the order-invariant numeric embedding 118.

In particular, the process neural network 104 is configured to, at a given time step, update the current internal state of the LSTM subnetwork 108 to generate a modified updated internal state for the time step. The modified updated internal state can be generated in two stages. First, the LSTM subnetwork 108 itself generates an initial updated internal state for the time step by processing the current internal state without additional inputs. Second, the auxiliary subsystem 110 receives the initial updated internal state for the time step from the LSTM subnetwork 108 and applies an attention mechanism over the memory vectors 116 to modify the initial updated internal state to generate a modified updated internal state for the LSTM subnetwork 108.

In some implementations, the auxiliary subsystem 110 performs a series of operations in applying the attention mechanism at a given time step to generate the modified updated internal state from the initial updated internal state. First, the subsystem 110 determines, for each of the memory vectors 116, a respective similarity value for the memory vector that indicates a level of similarity between the memory vector and the initial updated internal state for the time step. For example, the similarity value for a memory vector can be calculated by taking the dot product between the memory vector and a vector for the initial updated internal state for the time step. Second, the subsystem 110 determines, for each of the memory vectors 116, a respective attention weight value for the memory vector based on the respective similarity value for the memory vector. In one example, the attention weight value for a given memory vector is computed as the ratio of the exponential of the similarity value for the given memory vector to the sum of the exponentials of the respective similarity values for all of the memory vectors 116 for the input set 112. Third, the subsystem 110 combines all or some of the memory vectors 116 in accordance with their respective attention weight values to generate a read vector. For example, each of the memory vectors 116 can be multiplied by the respective attention weight value for the memory vector to generate weighted memory vectors. The read vector is then determined as the sum of the weighted memory vectors. Finally, the subsystem 110 combines the initial updated internal state and the read vector to generate the modified updated internal state for the time step. The modified updated internal state is applied to the LSTM subnetwork 108 so that, at the next time step, the current internal state at that time step is the modified updated internal state from the preceding time step. At the last processing time step, the system 100 takes the modified updated internal state as the order-invariant numeric embedding 118 for the input set 112.

The neural network system 100 also includes a write neural network 106 that is configured to receive the order-invariant numeric embedding 118 from the process neural network 104 and to process the order-invariant numeric embedding 118 to generate the neural network output 114 for the input set 112. The architecture of the write neural network 106 will generally depend on the type of neural network output 114 that the system 100 is configured to generate. In some implementations, the write neural network 106 is a pointer recurrent neural network configured to process the order-invariant numeric embedding 118 to generate a sequence of pointers to the inputs in the input set 112. An example of such a pointer recurrent neural network is described more fully in application Ser. No. 15/076,426, entitled "GENERATING OUTPUT SEQUENCES FROM INPUT SEQUENCES USING NEURAL NETWORKS," filed on Mar. 21, 2016, the entire contents of which are hereby incorporated by reference herein. In some other implementations, the write neural network 106 is a recurrent neural network, e.g., a decoder recurrent neural network, configured to process the order-invariant numeric embedding 118 to generate a sequence of neural network outputs, e.g., output sequence $y_1 \ldots y_t$. An example of such a recurrent neural network is described in more detail in application Ser. No. 14/731,326, entitled "GENERATING REPRESENTATIONS OF INPUT SEQUENCES USING NEURAL NETWORKS," filed on Jun. 4, 2015, the entire contents of which are hereby incorporated by reference herein. For example, such a system with a write recurrent neural network that generates sequences of outputs for a set of inputs, may be configured to process inputs that represent image features and the output may be a sentence (i.e., a sequence of words) that represents a description of the image features. As another example, if the input to the system is features of a spoken utterance, the output generated by the system may be a sequence of words that represents a transcription of the spoken utterance.

Figure 2:
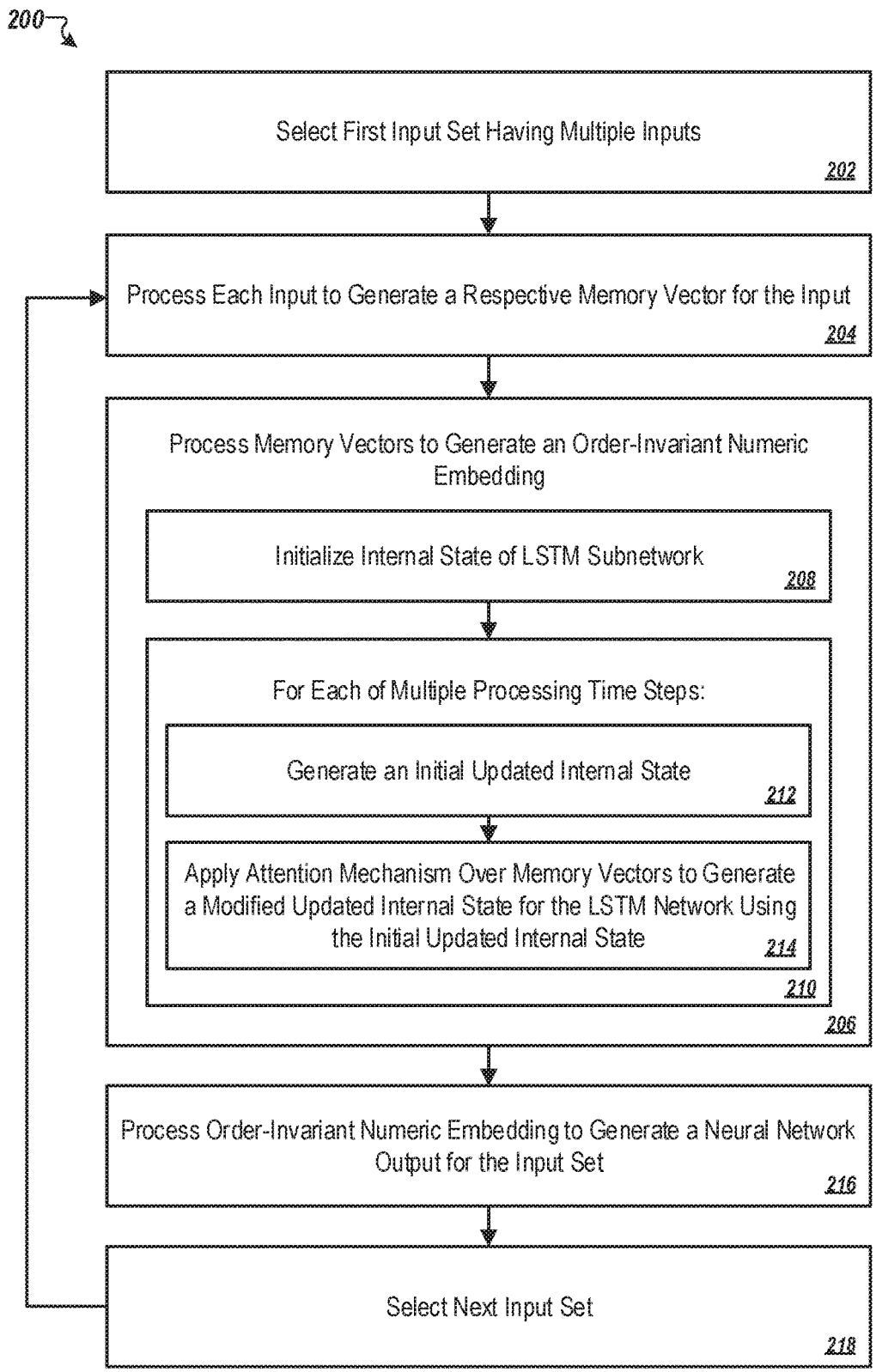
FIG. 2 is a flowchart of an example process for using a neural network system to generate a neural network output from a set of inputs.

FIG. 2 is flowchart of an example process 200 for using a neural network system to generate a neural network output from a set of inputs. In some implementations, the process 200 may be carried out by a neural network system, e.g., neural network system 100, which includes a read neural network, a process neural network, and a write neural network.

At stage 202, the neural network system selects a first input set, e.g., input set 112, which includes a collection of input data items (neural network inputs). The collection of input data items in the input set 112 may be unordered. Alternatively, the data input items in the input set 112 may be associated with an order, but the order does not matter to generation of the neural network output. For example, an ordered sequence of input data items may be converted to a set of input data items by augmenting each data input item with an indication of that item's position in the ordered sequence. Thus, the phrase or word sequence "He walked to school" may be converted to a set of data items (He, 1), (walked, 2), (to, 3), (school, 4). In this way, the ordered sequence may be recovered from the set of data items using the augmented positional information, but the order of the augmented data items in the set does not matter.

At stage 204, the neural network system processes each input data item in the first input set to generate a respective memory vector for the input data item. In some implementations, a read neural network, e.g., read neural network 102, processes the input data items to generate the respective memory vectors, e.g., memory vectors 116.

At stage 206, the neural network system generates an order-invariant numeric embedding using the memory vectors for the first input set. In some implementations, the system includes a process neural network, e.g., process neural network 104, that includes an LSTM subnetwork, e.g., LSTM subnetwork 108, and an auxiliary subsystem, e.g., auxiliary subsystem 110.

To generate the order-invariant numeric embedding, the process neural network may perform the operations represented in stages 208-214. In particular, at stage 208, the process neural network initializes the internal state of the LSTM subnetwork 208, e.g., by setting the internal state to a pre-defined initial internal state. At stage 210, the process neural network processes the internal state of the LSTM subnetwork and the memory vectors for the input set over multiple time steps to generate the order-invariant numeric embedding. At each time step, the process neural network performs the operations represented in stages 212 and 214. Specifically, at stage 212, for a given time step, the process neural network generates an initial updated internal state from the current internal state of the LSTM subnetwork. The initial updated internal state may be generated independently of the memory vectors or other inputs by applying a transformation defined by the LSTM subnetwork to the current internal state of the LSTM subnetwork.

Then, at stage 214, for a given time step, the auxiliary subsystem applies an attention mechanism over the memory vectors for the input set to generate a modified updated internal state for the time step from the initial updated internal state for the time step. In some implementations, generating the modified updated internal state for the time step first includes determining, for each of the memory vectors, a respective similarity value for the memory vector that indicates a level of similarity between the memory vector and the initial updated internal state for the time step. The auxiliary subsystem then determines, for each of the memory vectors, a respective attention weight value for the memory vector based on the respective similarity value for the memory vector. The subsystem combines all or some of the memory vectors in accordance with their respective attention weight values to generate a read vector. Finally, the subsystem combines the initial updated internal state and the read vector to generate the modified updated internal state for the time step. The modified updated internal state is applied to the LSTM subnetwork so that, at the next time step, the current internal state at that time step is the modified updated internal state from the preceding time step. At the last processing time step, the system may take the modified updated internal state at the time step as the order-invariant numeric embedding for the first input set.

At stage 216, the neural network system processes the order-invariant numeric embedding to generate a neural network output for the input set. In some implementations, the neural network system includes a write neural network, e.g., write neural network 106, that receives the order-invariant numeric embedding from the process neural network and generates the neural network output from the order-invariant numeric embedding. In some implementations, the write neural network is a pointer recurrent neural network configured to process the order-invariant numeric embedding to generate a sequence of pointers to the inputs in the input set. In some other implementations, the write neural network is a recurrent neural network, e.g., a decoder recurrent neural network, configured to process the order-invariant numeric embedding to generate a sequence of neural network outputs.

At stage 218, having produced a neural network output for the first input set, the neural network system may then select a next input set and returns to stage 204 to process the next input set. Stages 204-216 may be repeated on the next input step to generate a neural network output for the next input set.

In general, the neural network systems described in this specification can be configured to receive any kind of digital data input and to generate any kind of score or classification output, or sequence of outputs, based on the input. For example, if the inputs to the system are a set of numbers that are to be sorted, the output generated by the system may be a sequence of numbers sorted according to a particular order. As another example, if the inputs to the system represent image features, the output generated by the system may be a sentence (i.e., a sequence of words) that represents a description of the image features. As yet another example, if the input to the system are features of a spoken utterance, the output generated by the system may be a sequence of words that represents a transcription of the spoken utterance.

Figure 3:
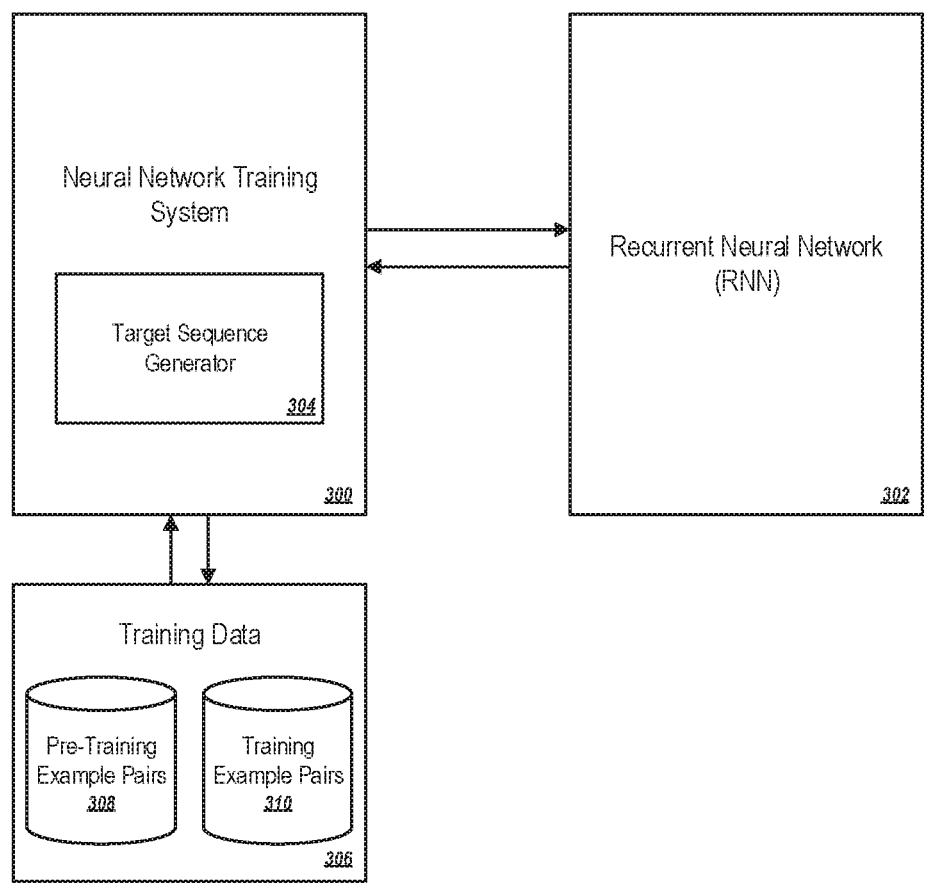
FIG. 3 depicts an example neural network training system that is configured to train a recurrent neural network to generate a set of neural network outputs for a neural network input.

FIG. 3 depicts an example neural network training system 300 that may be employed in a second aspect of this specification to train a recurrent neural network, e.g., recurrent neural network 302, which is configured to receive a neural network input and to sequentially emit outputs to generate an output sequence for the neural network input.

The training system 300 uses training data 306 to train the recurrent neural network 302. In some implementations, the training data 306 includes pre-training example pairs 308 and primary training example pairs 310. Each example pair in the training data 306 can include a training input and a target output set. The training input can be any kind of digital data input, e.g., a sequence of data input items, and the training target set can consist of a collection of target outputs of any kind of score or classification output corresponding to the training input. No order may be prescribed for the collection of target outputs, e.g., because the target outputs are not naturally expressed as a sequence. However, because experimental results have demonstrated that the order in which the target outputs in a target output set can impact how effectively the recurrent neural network 302 is trained, the training system 300 is configured to determine an optimal order for the target outputs that maximally simplifies a prescribed task, even where the optimal order is not known a priori. The operations for training a recurrent neural network, including determining optimal orders for target output sets when training the recurrent neural network, are described more fully with respect to FIGS. 4 and 5 below.

Figure 4:
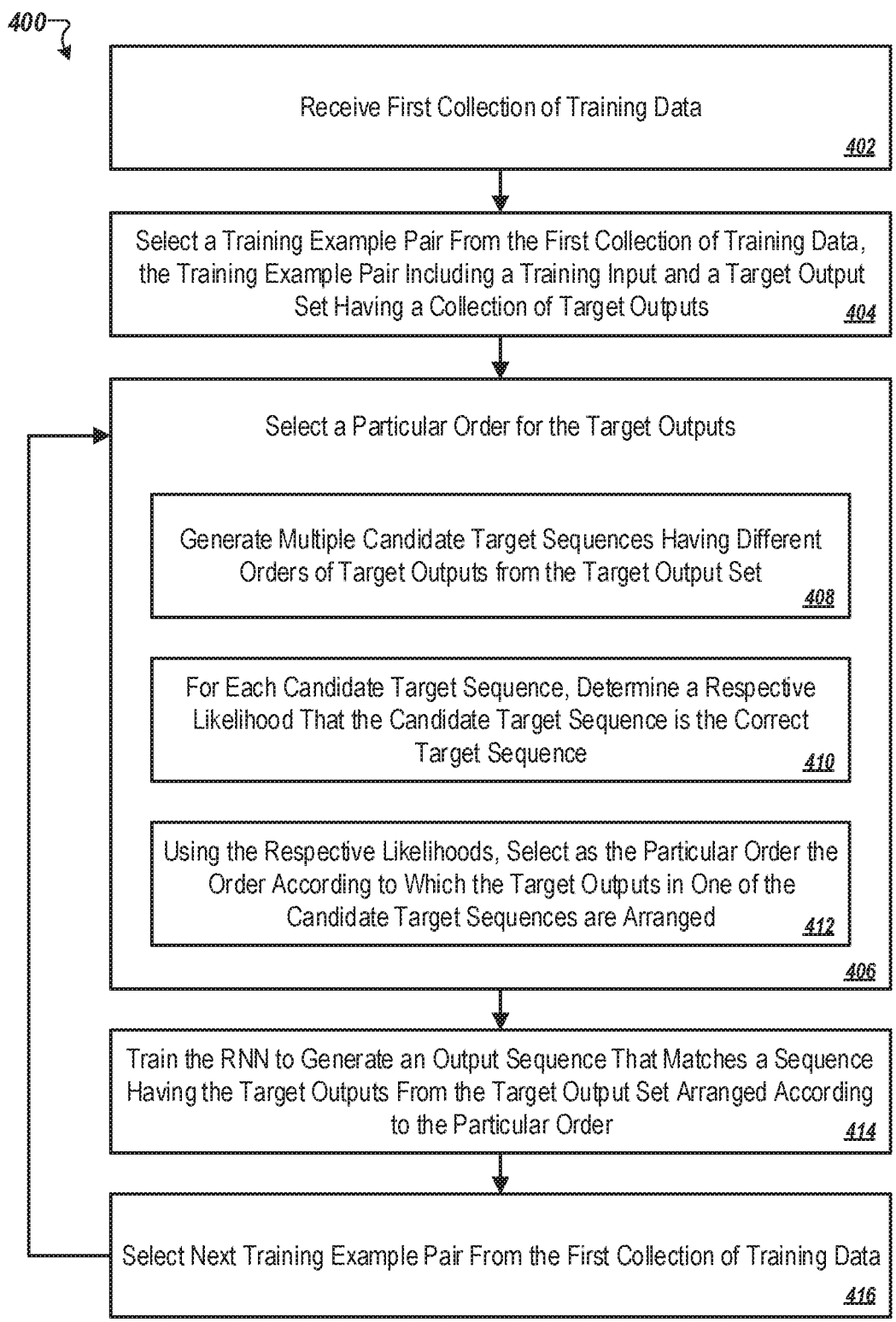
FIG. 4 is a flowchart of an example process for training a recurrent neural network that receives a neural network input and sequentially emits outputs to generate an output sequence for the neural network input.

FIG. 4 is a flowchart of an example process 400 for training a recurrent neural network using training data having target output sets for which an optimal order of the target outputs is unknown a priori. In some implementations, the process 400 is carried out by a neural network training system, e.g., neural network training system 300, to train a recurrent neural network, e.g., recurrent neural network 302, using training data, e.g., training example pairs 310.

At stage 402, the training system receives a first collection of training data. The first collection of training data can include many training example pairs that each includes a training input and a target output set. The respective target output set for each training example pair can include a collection of target outputs. The collection of target outputs may be unordered, or at least an optimal order for the outputs may not be specified before training.

At stage 404, the training system selects a training example pair from the first collection of training data. The selected training example pair will be used by the training system to train the recurrent neural network during stages 406-414.

At stage 406, the training system selects a particular order, e.g., an optimal order, for the target outputs of the target output set in the selected training example pair. In some implementations, the training system selects the particular order for the target outputs according to the operations represented in stages 408, 410, and 412.

In particular, at stage 408, the training system generates multiple candidate target sequences from the target outputs in the target output set. The target outputs in each candidate target sequence are ordered relative to each other differently from how they are ordered in each other candidate target sequence. In some implementations, a target sequence generator of the training system, e.g., target sequence generator 304, generates a respective candidate target sequence for every possible permutation of target outputs. Thus, for a target output set having n target outputs, the target sequence generator may create n! candidate target sequences. In some other implementations, candidate target sequences for less than all the possible permutations of target outputs may be created. For example, the training system may generate the candidate target sequences by performing an inexact search over all possible orderings of the target outputs from the target output set.

At stage 410, for each candidate target sequence, the training system determines a respective likelihood value for the candidate target sequence that indicates a likelihood, e.g., a probability or a log likelihood, that the candidate target sequence is the correct sequence to use for training the recurrent neural network. That is, the respective likelihood value for a given candidate target sequence may indicate a likelihood that the candidate target sequence would most effectively optimize a training result among each of the available candidate target sequences, as determined in accordance with current values of the parameters of the recurrent neural network.

At stage 412, the training system selects as the particular order for the target outputs in the target output set the order according to which the target outputs in a particular one of the candidate target sequences are arranged. In some implementations, the system selects the order from the particular candidate target sequence based on the likelihood values for the candidate target sequences indicating that the particular candidate target sequence has the greatest likelihood of being the correct target sequence among all of the candidate target sequences. In some other implementations, the system samples the particular candidate target sequence from the available candidate target sequences in accordance with the respective likelihoods and then selects as the particular order the order according to which the target outputs in the sampled candidate target sequence are arranged.

At stage 414, having selected the particular order, the training system trains the recurrent neural network to generate an output sequence that matches a sequence in which the target outputs from the target output set are arranged according to the particular order. In some implementations, the training system employs conventional machine-learning techniques, such as backpropagation and stochastic gradient descent over time to adjust the values of the parameters of the recurrent neural network and optimize a loss function. At stage 416, the process 400 continues by selecting another training example pair from the first collection of training data, and returning to stage 406. The process 400 can continue until a terminating condition is reached, e.g., all of the training example pairs have been processed or another training objective is satisfied.

Generally, in some implementations, the process 400 allows the training system to determine which is the optimal ordering for which the recurrent neural network can apply the chain rule. More formally, if it is assumed that there exists an ordering which maximally simplifies the task, $\pi(X)$, where X is the training input sequence or set (which can be empty), then the training system may train recurrent neural network as $p(Y_{\pi(X)}|X)$, where Y is the training target output. Because the number of possible orderings of the target outputs can be large, the training system may perform an inexact search to identify an optimal ordering during training. Instead of maximizing the log probability of $p(Y|X)$ for each training example pair, the system may maximize over orderings as follows:

$$\theta^* = \operatorname{argmax}_\theta \sum_i \max_{\pi(X_i)} \log p(Y_{\pi(X_i)} \mid X_i; \theta) \qquad \text{Equation 1}$$

Where $\max_{\pi(X_i)}$ is computed either naively, or with an inexact match. If done naively, the training system may sometimes pick a random ordering as a function of the initial parameters of the recurrent neural network, and may become permanently stuck on that ordering. To address this potential problem, the training system may in some implementations employ a pre-training procedure to initialize the parameters of the recurrent neural network before the primary training phase, e.g., as described with respect to FIG. 4, in a manner that reduces the likelihood of prematurely becoming stuck on a particular ordering. For example, the training system may pre-train the recurrent neural network with a uniform prior ordering over $\pi(X)$ for 1,000 steps, e.g., by effectively replacing the $\max_{\pi(X_i)}$ in Equation 1 with the operation $\Sigma_{\pi(X_i)}$. The training system can then select the particular ordering with which to train the recurrent neural network by sampling $\pi(X)$ according to a distribution proportional to $p(Y_{\pi(X)}|X)$.

Figure 5:
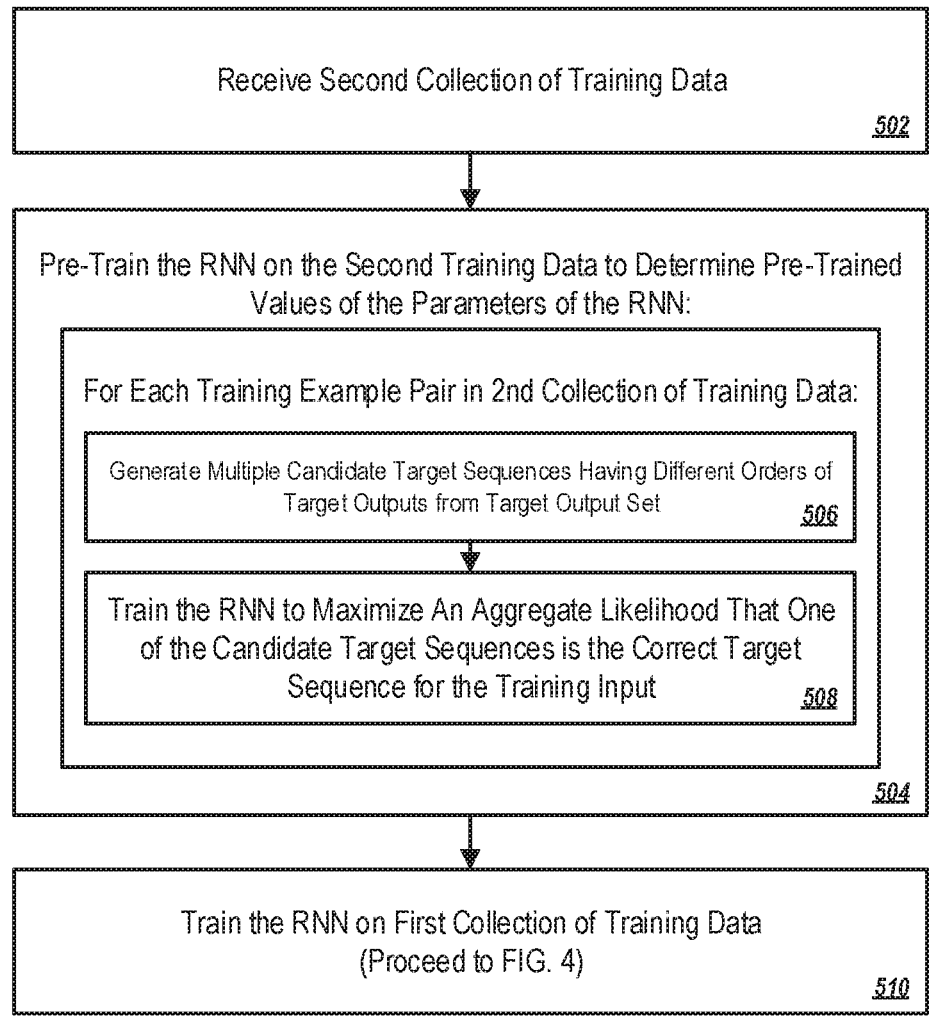
FIG. 5 is a flowchart of an example process for pre-training a recurrent neural network that receives a neural network input and sequentially emits outputs to generate an output sequence for the neural network input.

FIG. 5 is a flowchart of an example process 500 for pre-training a recurrent neural network that receives a neural network input and sequentially emits outputs to generate an output sequence for the neural network input. The process 500 may be performed by a neural network training system, e.g., training system 300, using training example pairs that each have a respective training input and a respective target output set. In some implementations, the training system performs the process 500 on a limited number of training example pairs before performing primary training as described with respect to FIG. 4. However, when the primary training phase begins, the internal parameters of the recurrent neural network may be initialized in a favorable manner as a result of the pre-training procedure.

At stage 502, the training system receives a second collection of training data. The second collection of training data includes training example pairs that each have a training input and a target output set. The respective target output set for each training example pair can include a collection of target outputs. The collection of target outputs may be unordered, or at least an optimal order for the outputs may not be specified before training. In some implementations, the training example pairs from the second collection of training data are selected from the first collection of training data that will be used during primary training.

The training system pre-trains the recurrent neural network on the second training data to determine pre-trained values of the parameters of the recurrent neural network (stage 504). For each training example pair in the second collection of training data, the training system performs the operations represented in stages 506 and 508. For example, at stage 506, the training system generates multiple candidate target sequences, where the target outputs from the target output set of a given training example pair are arranged in different orders in each of the candidate target sequences. At stage 508, the training system trains the recurrent neural network to maximize an aggregate likelihood that one of the candidate target sequences is the correct target sequence for the training input.

Pre-training completes upon the occurrence of a termination condition, e.g., after the training system has trained the recurrent neural network on a predetermined number of training example pairs. At stage 510, the training system may then invoke the primary training procedure as described with respect to FIG. 4.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A neural network system implemented by one or more computers, the neural network system comprising:
    a read neural network configured to: receive an input set comprising a plurality of inputs, and process the input set to generate a set of memory vectors, each memory vector corresponding to a different input from the input set;
    a process neural network comprising a recurrent neural network configured to maintain an internal state; and
    a write neural network configured to:
    process an order-invariant numeric embedding to generate a neural network output for the input set;
    wherein the neural network system is configured to generate the order-invariant numeric embedding for the input set by performing operations at each of a plurality of time steps, the operations at each time step including modifying an initial version of the internal state of the process neural network at the time step based on a weighted sum of memory vectors from the set of memory vectors, wherein each memory vector is weighted based on a level of similarity between the initial version of the internal state of the process neural network at the time step and the memory vector, wherein the order-invariant numeric embedding is permutation invariant to the inputs in the input set.

2. The neural network system of claim 1, wherein the process neural network comprises:
    a long short-term memory (LSTM) neural network.

3. The neural network system of claim 1, wherein the order-invariant numeric embedding for the input set comprises a modified version of the internal state of the process neural network that results from operations performed at the last time step of the plurality of time steps.

4. The neural network system of claim 1, wherein modifying the initial version of the internal state of the process neural network at each time step comprises:
    determining a respective similarity value for each of the memory vectors from the set of memory vectors, wherein the respective similarity value represents a similarity between the initial version of the internal state of the process neural network and the memory vector;
    generating, based on the respective similarity values, a respective attention weight for each of the memory vectors;
    generating a read vector by combining the memory vectors in accordance with the attention weights; and
    combining the initial version of the internal state of the process neural network and the read vector to generate the modified version of the internal state of the process neural network for the time step.

5. The neural network system of claim 4, wherein determining the respective similarity value for each of the memory vectors comprises determining a dot product between the initial version of the internal state of the process neural network and the memory vector.

6. The neural network system of claim 1, wherein the write neural network is a pointer recurrent neural network configured to process the order-invariant numeric embedding to generate a plurality of pointers to the inputs in the input set.

7. The neural network system of claim 1, wherein the write neural network is a recurrent neural network configured to process the order-invariant numeric embedding to generate a sequence of neural network outputs.

8. The neural network system of claim 1, wherein the initial version of the internal state of the process neural network at each time step after the initial time step in the plurality of time steps is a version of the internal state of the process neural network that results from updating the modified version of the internal state of the process neural network from a preceding time step.

9. The neural network system of claim 1, wherein the read neural network comprises a feedforward neural network.

10. A computer-implemented method, comprising:
receiving, by a read neural network, an input set comprising a plurality of inputs; processing, by the read neural network, the input set to generate a set of memory vectors, each memory vector corresponding to a different input from the input set;
providing a process neural network comprising a recurrent neural network that maintains an internal state;
generating, by an auxiliary system, an order-invariant numeric embedding for the input set that is permutation invariant to the inputs in the input set, wherein generating the order-invariant numeric embedding comprises, at each of a plurality of time steps:
(i) computing a weighted sum of memory vectors from the set of memory vectors, wherein each memory vector is weighted based on a level of similarity between the memory vector and an initial version of the internal state of the process neural network at the time step; and
(ii) modifying the initial version of the internal state of the process neural network at the time step based on the weighted sum of memory vectors; and
processing, by a write neural network, the order-invariant numeric embedding to generate a neural network output for the input set.

11. The computer-implemented method of claim 10, wherein the process neural network comprises a long short-term memory (LSTM) neural network.

12. The computer-implemented method of claim 10, wherein the order-invariant numeric embedding for the input set comprises a modified version of the internal state of the process neural network that results from operations performed at the last time step of the plurality of time steps.

13. The computer-implemented method of claim 10, wherein modifying the initial version of the internal state of the process neural network at each time step comprises:
determining a respective similarity value for each of the memory vectors from the set of memory vectors, wherein the respective similarity value represents a similarity between the initial version of the internal state of the process neural network and the memory vector;
generating, based on the respective similarity values, a respective attention weight for each of the memory vectors;
generating a read vector by combining the memory vectors in accordance with the attention weights; and
combining the initial version of the internal state of the process neural network and the read vector to generate the modified version of the internal state of the process neural network for the time step.

14. The computer-implemented method of claim 13, wherein determining the respective similarity value for each of the memory vectors comprises determining a dot product between the initial version of the internal state of the process neural network and the memory vector.

15. The computer-implemented method of claim 10, wherein the write neural network is a pointer recurrent neural network configured to process the order-invariant numeric embedding to generate a plurality of pointers to inputs in the input set.

16. The computer-implemented method of claim 10, wherein the write neural network is a recurrent neural network configured to process the order-invariant numeric embedding to generate a sequence of neural network outputs.

17. The computer-implemented method of claim 10, wherein the initial version of the internal state of the process neural network at each time step after the initial time step in the plurality of time steps is a version of the internal state of the process neural network that results from updating the modified version of the internal state of the process neural network from a preceding time step.

18. The computer-implemented method of claim 10, wherein the auxiliary system is a part of the process neural network or is external to the process neural network.

19. The computer-implemented method of claim 10, wherein the read neural network comprises a feedforward neural network.

20. The neural network system of claim 1, wherein the initial version of the internal state of the process neural network at the time step is generated at the time step by updating the internal state of the process neural network independently of the set of memory vectors.

* * * * *